(12) United States Patent
Bozinovski

(10) Patent No.: US 9,168,878 B2
(45) Date of Patent: Oct. 27, 2015

(54) ROOF DITCH MOLDING RETAINER ASSEMBLY

(75) Inventor: Michelle E. Bozinovski, Macomb Township, MI (US)

(73) Assignee: Illinois Tool Works Inc., Glenview, IL (US)

( * ) Notice: Subject to any disclaimer, the term of this patent is extended or adjusted under 35 U.S.C. 154(b) by 117 days.

(21) Appl. No.: 13/979,421

(22) PCT Filed: Jan. 13, 2012

(86) PCT No.: PCT/US2012/021312
§ 371 (c)(1),
(2), (4) Date: Jul. 12, 2013

(87) PCT Pub. No.: WO2012/097298
PCT Pub. Date: Jul. 19, 2012

(65) Prior Publication Data
US 2013/0283576 A1 Oct. 31, 2013

Related U.S. Application Data

(60) Provisional application No. 61/433,017, filed on Jan. 14, 2011.

(51) Int. Cl.
| | |
|---|---|
| *B60R 13/02* | (2006.01) |
| *B60R 13/04* | (2006.01) |
| *B60R 13/06* | (2006.01) |
| *F16B 5/12* | (2006.01) |
| *F16B 21/08* | (2006.01) |
| *F16B 2/22* | (2006.01) |

(52) U.S. Cl.
CPC ............. *B60R 13/0206* (2013.01); *B60R 13/04* (2013.01); *B60R 13/06* (2013.01); *F16B 2/22* (2013.01); *F16B 5/123* (2013.01); *F16B 5/128* (2013.01); *F16B 21/08* (2013.01); *Y10T 24/303* (2015.01); *Y10T 24/309* (2015.01); *Y10T 24/44752* (2015.01); *Y10T 24/45105* (2015.01)

(58) Field of Classification Search
CPC .. B60R 13/04; B60R 13/0206; Y10T 24/309; Y10T 24/303; Y10T 24/44752; F16B 21/08; F16B 2/22
USPC ................................ 24/297, 581.11, 289, 292
See application file for complete search history.

(56) References Cited

U.S. PATENT DOCUMENTS

| | | | |
|---|---|---|---|
| 6,564,433 B2 * | 5/2003 | Nagasawa ........................ 24/297 |
| 2009/0021053 A1 | 1/2009 | Harberts et al. | |
| 2009/0031539 A1 * | 2/2009 | Kuntze et al. .................... 24/292 |
| 2011/0010898 A1 * | 1/2011 | Scroggie et al. ................. 24/292 |

FOREIGN PATENT DOCUMENTS

| | | |
|---|---|---|
| DE | 10356382 A1 | 7/2005 |
| DE | 202007016803 U1 | 2/2008 |

OTHER PUBLICATIONS

International Search Report and Written Opinion corresponding to PCT/US2011/067813 dated Apr. 5, 2012.

* cited by examiner

*Primary Examiner* — Robert J Sandy
*Assistant Examiner* — Michael Lee

(57) ABSTRACT

A multi-piece molding retainer assembly including a female stud engagement latch which is held in floating snap-fit relation within a molding engagement clip adapted to engage and retain the overlying molding. The stud engagement latch and the molding engagement clip are moveable in relation to one another in both the longitudinal and lateral directions after attachment. The retainer assembly accommodates variations in stud position and height such that the attached molding may be properly positioned despite variations in the studs.

20 Claims, 4 Drawing Sheets

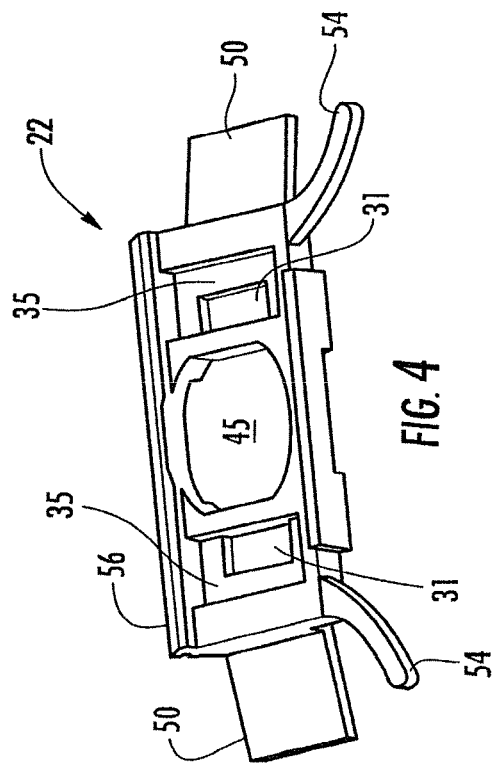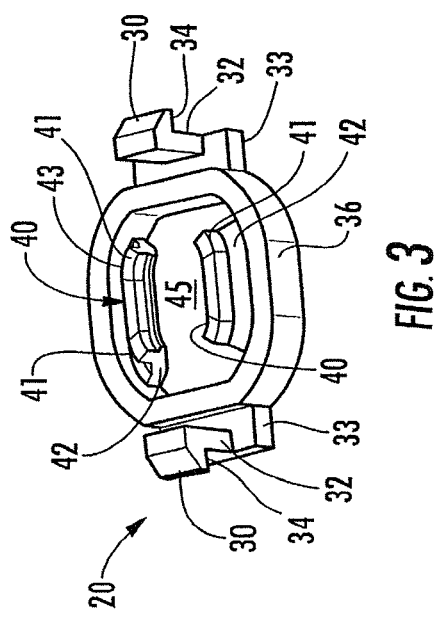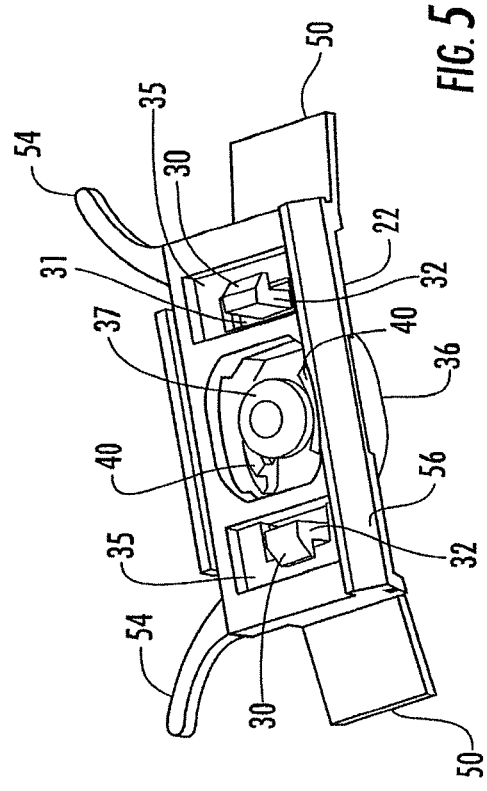

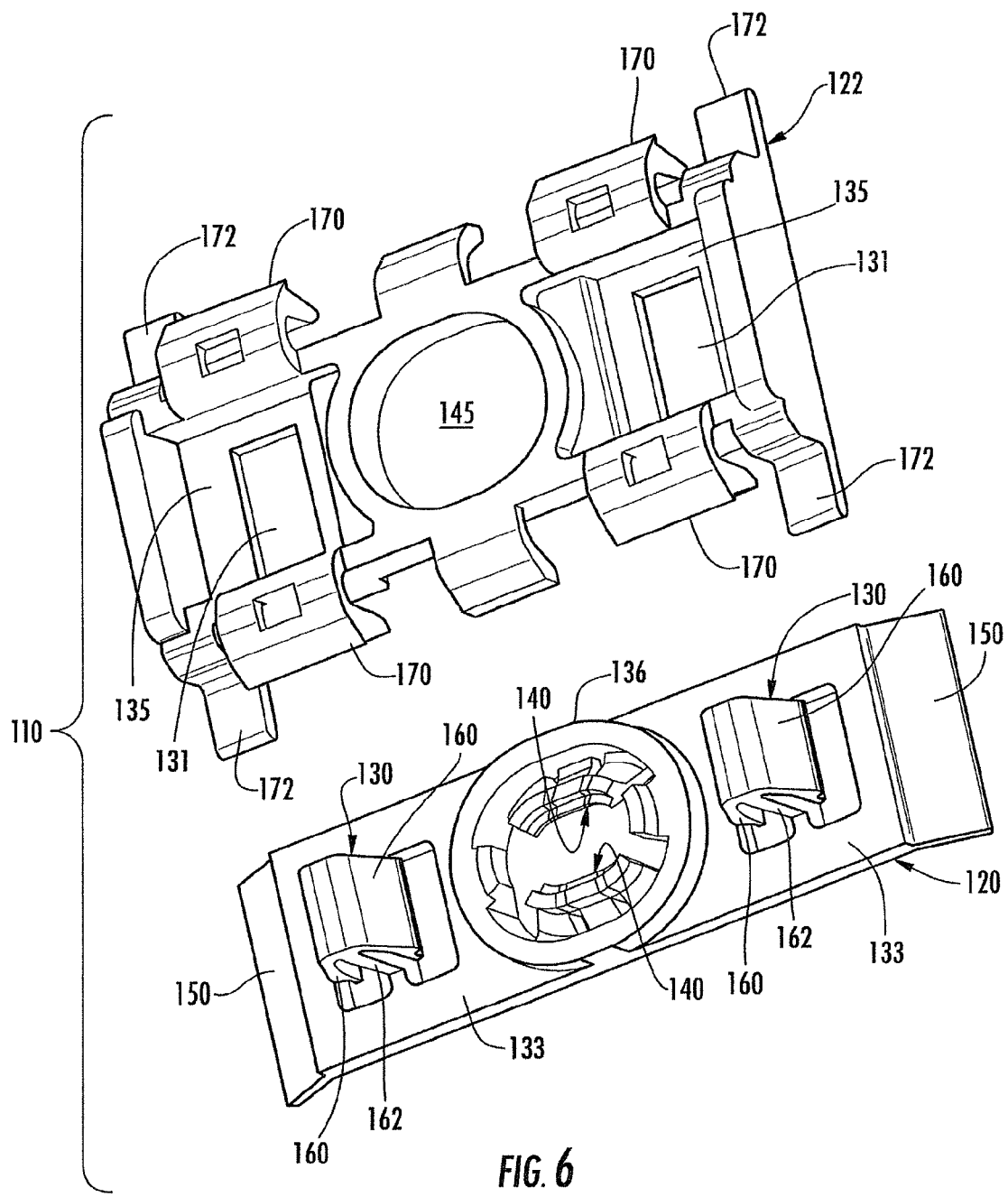

US 9,168,878 B2

ROOF DITCH MOLDING RETAINER ASSEMBLY

CROSS-REFERENCE TO RELATED APPLICATION

This application is a National Phase of International Application Number PCT/US2012/021312, filed Jan. 13, 2012 and claims the benefit of U.S. Provisional Application 61/433,017 filed Jan. 14, 2011.

TECHNICAL FIELD

The present invention relates generally to attachment clips for molding, and more particularly, to a retainer assembly adapted to secure a molding strip having a C-section interior in covering relation relative to a roof ditch extending along the intersection between a roof panel and side panel of an automotive vehicle or like environment.

BACKGROUND OF THE INVENTION

It is common to use molding and other trim elements on automobiles and similar products. Moldings may be applied to cover joints, seams and other unappealing features, or they may be applied simply for aesthetic purposes. Because it is not always easy to attach molding directly to automobile body parts, molding is often attached using a specialized retainer clip. A variety of automobiles now include a roof ditch that extends along a portion of the roof above the doors. The roof ditch is typically defined by the joint between the roof and the side panel of the automobile. Typically, the roof ditch is covered at least in part by a roof ditch molding. Such molding typically has an interior support of metal or the like with a generally "C" shaped section profile. The interior support may be covered with a more pliable material such as rubber or the like which extends outwardly to engage edges of the roof ditch. In many applications, the roof ditch molding is secured in the roof ditch by a plurality of retainers that attach to weld studs disposed along the roof ditch channel. In some instances, the lateral position and/or height of the weld studs may vary at different positions along the roof ditch. Such variation may make it difficult to obtain the desired placement of the overlying molding.

While prior molding retainers have worked well, they tend to be substantially fixed relative to the underlying studs or other structures to which they are attached. Thus, if the stud is out of position, the overlying molding will likewise tend to be out of position. Accordingly, a continuing need exists for a roof ditch molding retainer which accommodates variations in the weld stud or other attachment structure while maintaining a secure connection between the weld stud and the molding.

SUMMARY OF THE INVENTION

The present invention provides advantages and alternatives over the prior art by providing a multi-piece molding retainer assembly including a female stud engagement latch which is held in floating snap-fit relation within a molding engagement clip adapted to engage and retain the overlying molding. The stud engagement latch and the molding engagement clip are moveable in relation to one another in both the longitudinal and lateral (i.e. cross-car) directions. The retainer assembly accommodates variations in stud position and height within the roof ditch such that the attached molding may be properly positioned despite variations in the studs.

In one exemplary aspect, the present invention provides a molding retainer adapted to lockingly engage a connection stud having an enhanced diameter head within a vehicle roof ditch and to hold an elongate molding strip having a C-section support in covering relation to the vehicle roof ditch over the connection stud. The molding retainer includes a molding engagement clip adapted to engage an underside of the molding strip in nested relation to the C-section support such that the C-section support extends in arched relation between opposing lateral sides of the molding engagement clip. The molding engagement clip includes an arrangement of molding attachment elements adapted to lockingly engage interior surfaces of the molding strip. The molding engagement clip includes an acceptance opening oriented for alignment with the connection stud and a pair of window slots disposed on opposite sides of the acceptance opening. The molding retainer further includes a stud engagement latch, non-integral with the molding engagement clip. The stud engagement latch includes a raised stud containment ring adapted for insertion at least partially into the acceptance opening in the molding engagement clip. The stud containment ring further includes a pair of opposing snap structures projecting radially inwardly and adapted to snap behind the enhanced diameter head upon insertion of the connection stud. The stud engagement latch further includes a plurality of upwardly projecting snap-in latch elements positioned for alignment with the window slots when the stud containment ring is inserted into the acceptance opening. Each of the upwardly projecting snap-in latch elements includes a catch structure at an effective height to latch behind a surface adjacent a corresponding window opening upon at least partial insertion of the containment ring into the acceptance opening.

In another exemplary aspect, the present invention provides a method of holding an elongate molding strip having a C-section support in covering relation to a vehicle roof ditch over a connection stud having an enhanced diameter head within the vehicle roof ditch. The method includes providing a molding engagement clip adapted to engage an underside of the molding strip in nested relation to the C-section support such that the C-section support extends in arched relation between opposing lateral sides of the molding engagement clip, wherein the molding engagement clip includes an arrangement of molding attachment elements adapted to lockingly engage interior surfaces of the molding strip. The molding engagement clip includes an acceptance opening oriented for alignment with the connection stud and a pair of window slots disposed on opposite sides of the acceptance opening. The method further includes providing a stud engagement latch, non-integral with the molding engagement clip, wherein the stud engagement latch includes a raised stud containment ring adapted for insertion at least partially into the acceptance opening in the molding engagement clip. The stud containment ring includes a pair of opposing snap structures projecting radially inwardly and adapted to snap behind the enhanced diameter head upon insertion of the connection stud. The stud engagement latch further includes a plurality of upwardly projecting snap-in latch elements positioned for alignment with the window slots when the stud containment ring is inserted into the acceptance opening, each of the upwardly projecting snap-in latch elements having a catch structure at an effective height to latch behind a surface adjacent a corresponding window opening upon at least partial insertion of the containment ring into the acceptance opening. The method further includes inserting the upwardly projecting snap-in latch elements through corresponding window slots to establish a latched connection between the molding engagement clip and the stud engagement latch, inserting the molding engagement clip in nested relation to the C-section support, and inserting the connection stud into the raised stud containment ring between the opposing snap structures such that the opposing snap structures are disposed beneath the enhanced diameter head.

Other features and advantages of the invention will become apparent to those skilled in the art upon review of the following detailed description, claims and drawings in which like numbers are used to designate like features.

BRIEF DESCRIPTION OF THE DRAWINGS

FIG. 3 is a schematic perspective elevation view illustrating an exemplary stud engagement latch used in the molding retainer assembly of FIG. 2;

FIG. 4 is a schematic perspective elevation view illustrating an exemplary molding engagement clip portion of the molding retainer assembly of FIG. 2;

FIG. 5 is a schematic elevation perspective view illustrating the stud of FIG. 1 secured at the interior of the stud engagement latch portion of the molding retainer assembly of FIG. 2;

FIG. 6 is an exploded view of another exemplary molding retainer assembly in accordance with the present invention;

Figure 1:
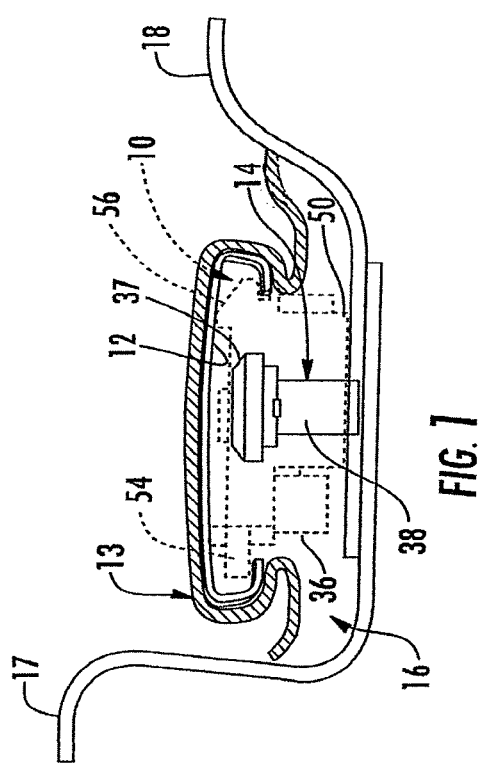
FIG. 1 is a schematic cut-away side view illustrating the respective orientation of a connection stud at the base of a roof ditch and a structural C-section of overlying molding with an exemplary molding retainer assembly shown in phantom.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed and equivalents thereof as well as additional items and equivalents thereof.

DETAILED DESCRIPTION OF THE PREFERRED EMBODIMENTS

Figure 2:
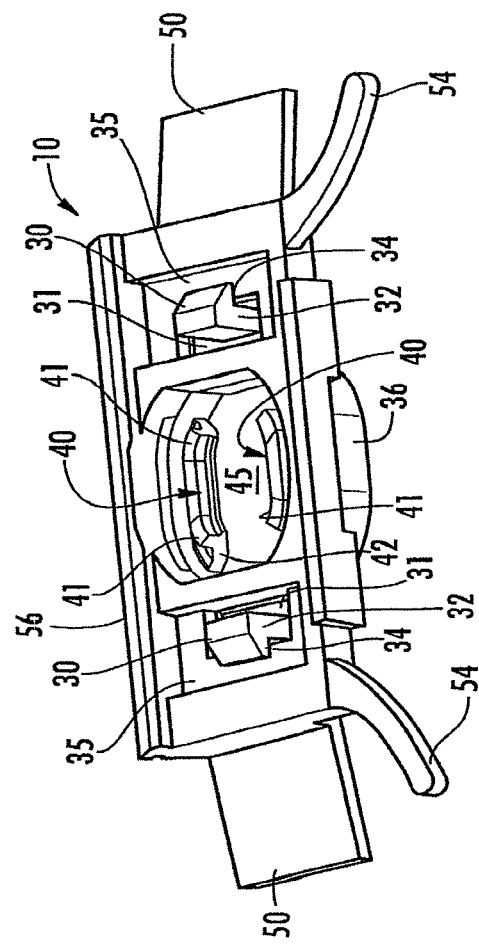
FIG. 2 is a schematic perspective elevation view illustrating an exemplary two-piece molding retainer assembly in accordance with the present invention.

Referring now to FIGS. 1, 2 and 5, in one exemplary embodiment, the present invention provides a molding retainer assembly 10 for securing a C-section 12 of a molding strip 13 in overlying relation to a connection stud 14 projecting upwardly from the base of a roof ditch 16 of an automobile or other similar environment of use. In this regard, it will be understood that the roof ditch 16 has a generally concave profile and may be formed at the intersection of a vehicle roof panel 18 and an adjacent or body side panel 17. In this regard, the roof ditch 16 typically extends substantially along the roof line of the vehicle. As will be appreciated by those of skill in the art, the C-section 12 may be formed from metal or other material having structural integrity and is typically provided with an outer covering of flexible polymer defining the exterior of the molding strip 13 which is configured to extend in sealing relation between opposing walls of the roof ditch 16. As best seen through joint reference to FIGS. 1 and 2, the molding retainer assembly 10 may have a generally elongated rectangular profile which may be oriented with its longitudinal dimension in general alignment with the longitudinal dimension of the roof ditch 16.

It is to be understood that while the molding retainer assembly 10 may be described in relation to its use within a roof ditch 16 of an automobile, the present invention is in no way limited to such use. Accordingly, the molding retainer assembly 10 may likewise be used to secure a molding strip in place in any number of other environments of use as may be desired.

As best seen through joint reference to FIGS. 2-5, in the illustrated exemplary embodiment, the molding retainer assembly 10 includes a stud engagement latch 20 (FIG. 3) adapted to matedly receive the connection stud 14. The molding retainer assembly 10 also includes a molding engagement clip 22 (FIG. 4) adapted to engage the underside of the "C" section 12 in a manner as will be described further hereinafter. According to one contemplated practice, the stud engagement latch 20 and the molding engagement clip 22 may each be formed as independent unitary structures from polymeric materials such as Nylon, acetal resin or the like by use of injection molding or other suitable formation practices as will be known to those of skill in the art. In this regard, the stud engagement latch 20 and a molding engagement clip 22 may be formed from either the same material or from different materials as may be desired.

As illustrated, the stud engagement latch 20 includes a pair of raised snap heads 30 of angled construction defining catch structures adapted to extend in snap-in relation through window slots 31 in the molding engagement clip 22. With the stud engagement latch 20 snapped into place, it is blocked against separation from the molding engagement clip 22. As shown, the snap heads 30 are mounted on support pillars 32 projecting upwardly from outboard platform surfaces 33 on the stud engagement latch. The snap heads 30 in combination with the support pillars 32 thus define upwardly projecting snap-in latch elements positioned for alignment with the window slots 31. In the exemplary construction, the snap heads 30 define shoulder stops 34 projecting in an outboard direction away from the support pillars 32 at an effective height such that in the assembled condition of FIG. 2, shoulder stops 34 are disposed in blocking relation over underlying support surfaces 35 disposed in framing relation adjacent to the window slots 31 on the molding engagement clip 22. As shown, the window slots 32 and adjacent support surfaces 35 may be in sunken relation to surrounding portions of the molding engagement clip 22 such that in the assembled condition, the snap heads 30 are substantially surrounded by slightly raised walls. As will be appreciated, such an arrangement protects against unintended disengagement.

In the illustrated exemplary construction the support pillars 32 supporting the snap heads 30 each have a smaller effective diameter in cross-section than the corresponding window slots 31 through which they project. Thus, the support pillars 32 may float within the windows while the latched condition is maintained. Accordingly, in the latched condition shown in FIG. 2, a degree of limited relative movement may take place between the stud engagement latch 20 and the molding engagement clip 22 in both the longitudinal and cross-car directions.

As best illustrated through joint reference to FIGS. 2 and 3, in the illustrated exemplary construction, the stud engagement latch 20 includes a stud containment ring 36 adapted to matedly receive and retain an enlarged diameter stud head 37 disposed at the distal end of a reduced diameter post portion 38 of the connection stud 14. The interior of the stud containment ring 36 includes a pair of opposing arc snap structures 40 formed from multiple molded-in cooperating flexible snap fingers 41 which project radially inwardly from the inner diameter of stud containment ring 36. In this regard, as best seen in FIG. 3, the exemplary snap fingers 41 making up the arc snap structures 40 have a generally dogleg profile such that the arc snap structures 40 include inwardly projecting leg segments 42 extending raised wall segments 43. Thus, the arc snap structures 40 include a raised wall in spaced relation radially inwardly from the inner diameter of the stud containment ring 36.

As shown, when the snap heads 30 are inserted in latching relation into the window slots 31, the stud containment ring 36 enters an acceptance opening 45 in the molding engagement clip 22 and is held against withdrawal by the latching connection at the window slots 31. The effective outer diameter of the stud containment ring 36 is slightly less than the effective inner diameter of the acceptance opening 45 to facilitate a degree of relative movement in the lateral and longitudinal directions.

With the stud containment ring 36 at least partially inserted into the acceptance opening 45, the raised wall segments 43 of the snap fingers 41 are disposed radially inwardly from the perimeter wall of an acceptance opening 45 in the molding engagement clip 22 to define a reduced diameter passthrough opening between the arc snap structures 40. In practice, when the stud head 37 is matedly inserted into the acceptance opening 45, the raised wall segments 43 will snap behind the underside of the stud head 37 upon full insertion as best seen in FIG. 5. In this connected relation, the arc snap structures 40 are disposed circumferentially partially about the post portion 38 of the connection stud 14. By snapping in partial surrounding relation about the connection stud 14, the stud engagement latch 20 may engage in a degree of forward and aft movement in the longitudinal direction relative to the fixed position connection stud 14 while maintaining a clamping connection. Moreover, since the effective outer diameter defined by the stud containment ring 36 is less than the inner diameter of acceptance opening 45, a degree of cross-car (i.e. lateral) movement also may take place. Thus, in the latched condition, the stud engagement latch 20 may move relative to the molding engagement clip 22.

In the exemplary construction, biasing arms 50 in the form of molded in leaf springs extend away from either end of the molding engagement portion 22. In operation, the biasing arms 50 act against the bottom of the roof ditch 16 so as to continuously urge the molding retainer assembly upwardly. As will be appreciated, such upward biasing aids in avoiding height variations at different positions along the length of the roof ditch 16 by urging each molding retainer assembly 10 always to the top of the corresponding connection stud.

As noted previously, the molding engagement clip 22 is adapted to engage a "C" section 12 of the molding strip 13. In the exemplary construction, the molding engagement clip 22 includes molding attachment elements in the form of a pair of outwardly curved flexible bullhorns 54 disposed along one lateral side and a sloped shoulder 56 defining an overhang ledge disposed along substantially the full length of the opposing lateral side. As best seen in FIG. 1, the bullhorns 54 engage one side of the C-section with the other side of the C-section being captured at the overhang defined by the sloped shoulder 56. Of course, virtually any other arrangement for securing the C-section in place may likewise be used.

As will be appreciated, in practice multiple connection studs 14 will be arranged along the base of the roof ditch 16. At each of the connection studs 14, a molding retainer assembly 10 as described may be oriented substantially longitudinally within the roof ditch 16. The molding retainer assemblies 10 may thus cooperatively engage a molding strip 13 at positions along the roof ditch to provide a secure cover.

Figure 7:
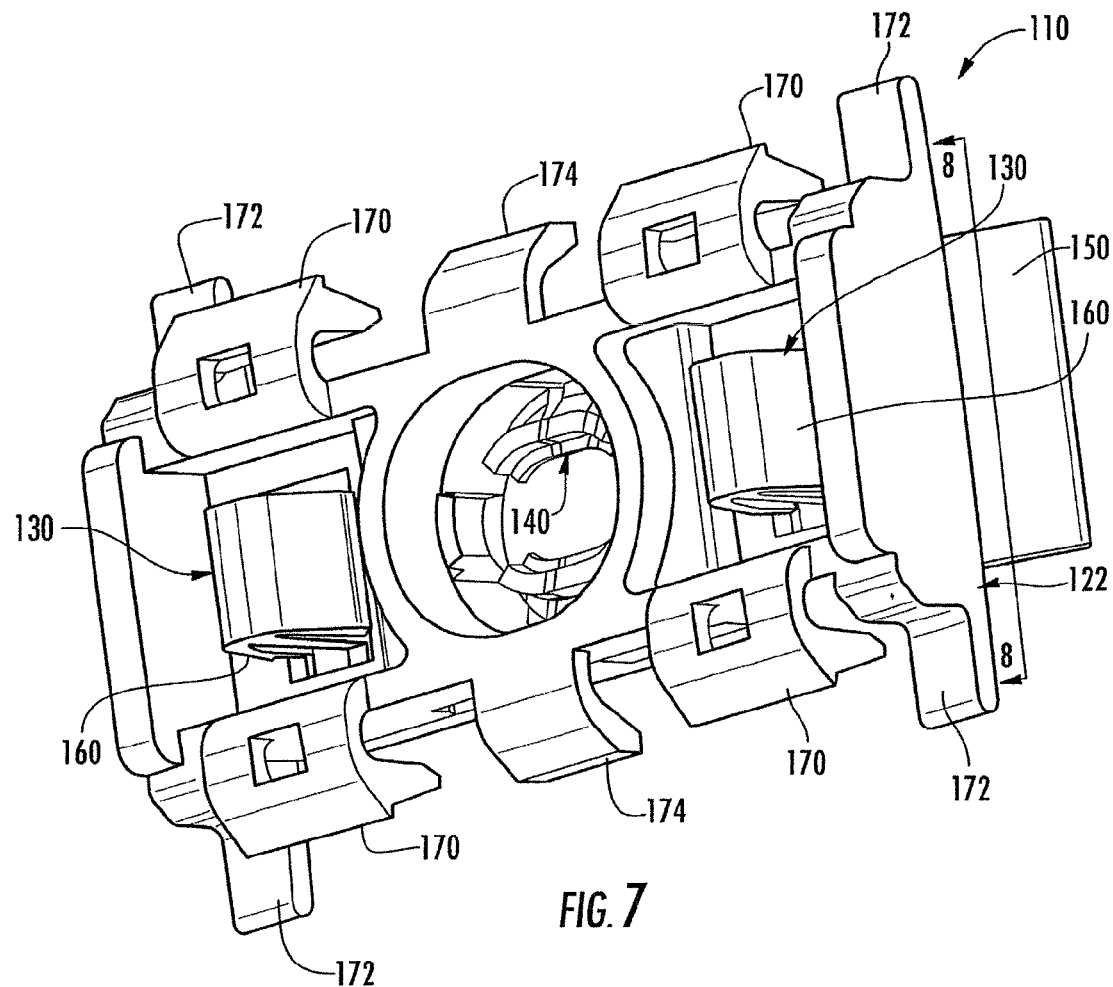
FIG. 7 is a schematic perspective view illustrating the molding retainer assembly of FIG. 6 in assembled condition.

FIGS. 6 and 7 illustrate another exemplary embodiment for a molding retainer assembly 110 in accordance with the present invention wherein elements corresponding to those described previously are designated by like reference numerals within a 100 series. As will be appreciated, in this embodiment the molding retainer assembly 110 may capture a stud head (not shown) between opposing arc snap structures 140 in substantially the same manner as described in relation to the previous embodiment wherein the snap ring structures define a reduced diameter passageway at the interior of an acceptance opening 145 in the molding engagement clip 122.

In the embodiment of FIGS. 6 and 7, the stud engagement latch 120 has a generally elongated rectangular configuration including extended platform surfaces 133 projecting outboard from the stud containment ring 136. Snap-in projections 130 defining upwardly projecting snap-in latch elements extend upwardly away from the platform surfaces for insertion into aligned window slots 131 disposed in sunken relation in the molding engagement clip 122. By way of example only, and not limitation, the snap-in projections 130 may have an arrowhead shaped profile with a pair of flexible wing elements 160 defining catch structures extending in downwardly angled relation away from the distal end of a support post 162. As will be appreciated, the wing elements are at an effective height such that during insertion of the snap-in projections 130 into the window slots 131, the wing elements 160 flex inwardly and then snap outwardly behind the sunken support surfaces 135 framing the window slots 131.

As shown, the support posts 162 of the snap-in projections 130 are smaller in cross-section than the corresponding window slots 131 through which they project. Thus, the support posts 162 may float within the window slots while the latched condition is nonetheless maintained. Accordingly, in the latched condition shown in FIG. 7, a degree of limited relative movement may take place between the stud engagement latch 120 and the molding engagement clip 122 in both the longitudinal and cross-car directions.

In the illustrated exemplary construction the stud engagement latch 120 further includes biasing arms 150 in the form of molded in leaf springs extending away from either end of the stud engagement latch. In operation, the biasing arms 150 act against the bottom of the roof ditch so as to continuously urge the molding retainer assembly 110 upwardly. As will be appreciated, such upward biasing aids in avoiding height variations at different positions along the length of the roof ditch by urging each molding retainer assembly 110 to the top of the corresponding connection stud.

Figure 8:
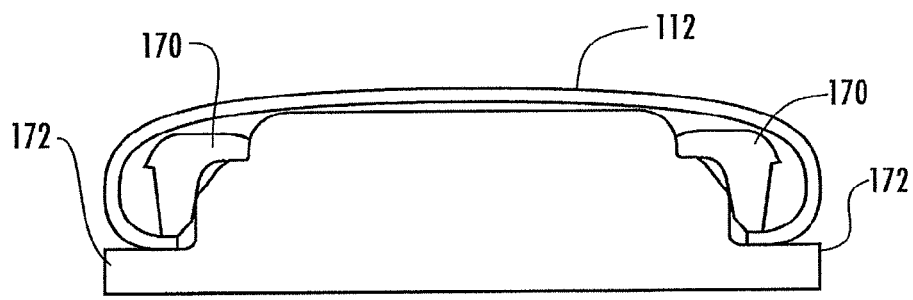
FIG. 8 is a schematic cross-section taken generally along line 8-8 in FIG. 7 illustrating retention of a C-section molding support.

In the exemplary embodiment illustrated in FIGS. 6 and 7, the molding engagement clip 122 includes an arrangement of downwardly curved flexible hooking elements 170 disposed along either lateral side. In use, as a molding C-section 112 (FIG. 8) is pressed onto the molding engagement clip 122, the hooking elements 170 flex inwardly and then spring out to latch behind the interior of the inwardly curved edge portions of the C-section. In addition, the illustrated exemplary molding engagement clip 122 includes an arrangement of outwardly projecting feet 172 disposed generally at the corners of the molding engagement clip 122 at an elevation below the reach of the hooking elements 170. In operation, as a molding C-section is pressed over the hooking elements 170, the feet 172 define a blocking surface beyond which the inwardly curved edge portion of the C-section cannot pass. Thus, in the final assembly, the inwardly curved edge portion of the C-section is clamped between the hooking elements 170 and the feet 172. At the same time, support elements 174 aid in maintaining the desired C-section profile. Of course, virtually any other arrangement for securing the C-section in place may likewise be used.

It is to be understood that variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

What is claimed is:

1. A molding retainer adapted to lockingly engage a connection stud having an enhanced diameter head within a vehicle roof ditch and to hold an elongate molding strip having a C-section support in covering relation to the vehicle roof ditch over the connection stud, the molding retainer comprising: a molding engagement clip adapted to engage an underside of the molding strip in nested relation to the C-section support such that the C-section support extends in arched relation between opposing lateral sides of the molding engagement clip, the molding engagement clip including an arrangement of molding attachment elements adapted to lockingly engage interior surfaces of the molding strip, the molding engagement clip including an acceptance opening oriented for alignment with the connection stud and a pair of window slots disposed on opposite sides of the acceptance opening; and a stud engagement latch, non-integral with the molding engagement clip, the stud engagement latch including a raised stud containment ring adapted for insertion at least partially into the acceptance opening in the molding engagement clip, the stud containment ring including a pair of opposing snap structures projecting radially inwardly and adapted to snap behind the enhanced diameter head upon insertion of the connection stud, the stud engagement latch further including a plurality of upwardly projecting snap-in latch elements positioned for alignment with the window slots when the stud containment ring is inserted into the acceptance opening, each of the upwardly projecting snap-in latch elements having a catch structure at an effective height to latch behind a surface adjacent a corresponding window opening upon at least partial insertion of the containment ring into the acceptance opening.

2. The molding retainer as recited in claim 1, wherein the arrangement of molding attachment elements include a pair of resilient, flexible curved bullhorn projections extending in diverging partial arcs away from a first lateral side of the molding engagement clip.

3. The molding retainer as recited in claim 2, wherein the arrangement of molding attachment elements further includes a sloped shoulder disposed along a second lateral side in substantially opposing relation to the first lateral side.

4. The molding retainer as recited in claim 1, wherein the arrangement of molding attachment elements comprises a plurality of angled hooking elements disposed along upper lateral edges of the molding engagement clip.

5. The molding retainer as recited in claim 4, further including a plurality of outwardly projecting feet adapted to limit downward movement of the molding strip, the feet extending outwardly from the molding engagement clip at an elevation below the angled hooking elements.

6. The molding retainer as recited in claim 1, wherein the molding engagement clip includes a pair of flexible, integral biasing arms angled downwardly from opposing ends of the molding engagement clip.

7. The molding retainer as recited in claim 1, wherein the stud engagement latch includes a pair of flexible, integral biasing arms angled downwardly from opposing ends of the molding engagement clip.

8. The molding retainer as recited in claim 1, wherein at least one of the upwardly projecting snap-in latch elements comprises an outwardly projecting angled snap head defining a shoulder stop projecting outboard from a support pillar, the support pillar having an effective outer diameter less than the effective inner diameter of the corresponding window opening such that the upwardly projecting snap-in latch element floats within the corresponding window opening.

9. The molding retainer as recited in claim 1, wherein at least one of the upwardly projecting snap-in latch elements has an arrowhead shaped profile with a pair of flexible wing elements defining catch structures extending in downwardly angled relation away from the distal end of a support post, and wherein the support post has an effective outer diameter less than the effective inner diameter of the corresponding window opening such that the upwardly projecting snap-in latch element floats within the corresponding window opening.

10. The molding retainer as recited in claim 1, wherein at least one of the snap structures comprises a plurality of snap fingers arranged in side by side relation to cooperatively define a curved arc projecting radially inwardly at the interior of the stud containment ring.

11. The molding retainer as recited in claim 1, wherein said at least one of the snap structures has a dogleg configuration including a leg segment projecting away from an inner wall of wall of the stud containment ring to a raised wall spaced apart from the inner wall of the stud containment ring.

12. The molding retainer as recited in claim 1, wherein each of the snap structures comprises a plurality of snap fingers arranged in side by side relation to cooperatively define a curved arc projecting radially inwardly at the interior of the stud containment ring.

13. The molding retainer as recited in claim 12, wherein each of the snap structures has a dogleg configuration including a leg segment projecting away from an inner wall of wall of the stud containment ring to a raised wall spaced apart from the inner wall of the stud containment ring.

14. The molding retainer as recited in claim 1, wherein each of the molding engagement clip and the stud engagement latch is a single-piece molded polymer structure.

15. A molding retainer adapted to lockingly engage a connection stud having an enhanced diameter head within a vehicle roof ditch and to hold an elongate molding strip having a C-section support in covering relation to the vehicle roof ditch over the connection stud, the molding retainer comprising:

a molding engagement clip of unitary, molded polymeric construction adapted to engage an underside of the molding strip in nested relation to the C-section support, each of the lateral sides including outwardly projecting molding attachment elements adapted to lockingly engage interior surfaces of the molding strip such that the C-section support extends in arched relation between opposing lateral sides, the molding engagement clip including an acceptance opening oriented for alignment with the connection stud and a pair of window slots disposed in sunken surfaces of the molding engagement clip on opposite sides of the acceptance opening, the sunken surfaces being disposed in at least partial framing relation around the window slots and being at least partially surrounded by raised walls; and a stud engagement latch of unitary, molded polymeric construction including a raised stud containment ring adapted for insertion at least partially into the acceptance opening in the molding engagement clip, the stud containment ring including a pair of opposing, circumferentially curved snap structures, projecting radially inwardly and adapted to snap behind the enhanced diameter head upon insertion of the connection stud into the stud containment ring, the stud engagement latch further including a pair of upwardly projecting snap-in latch elements disposed on opposite sides of the stud containment ring and positioned for alignment with the window slots when the stud containment ring is inserted into the acceptance opening, each of the upwardly projecting snap-in latch elements having a catch structure at an effective height to latch behind a sunken surface adjacent a corresponding window opening upon at least partial insertion of the containment ring into the acceptance opening and wherein below the catch structure, each upwardly projecting snap-in latch element has an effective outer diameter less than the effective inner diameter of the corresponding window opening such that the snap-in latch elements each float within the corresponding window openings, and wherein either the molding engagement clip or the stud engagement latch further includes a pair of flexible, integral biasing arms angled downwardly from opposing ends, the stud engagement latch and the molding engagement clip being non-integral with one another.

16. The molding retainer as recited in claim 15, wherein the molding attachment elements include a pair of resilient, flexible curved bullhorn projections extending in diverging partial arcs away from a first lateral side of the molding engagement clip and a sloped shoulder disposed along a second lateral side in substantially opposing relation to the first lateral side.

17. The molding retainer as recited in claim 15, wherein the molding attachment elements comprise a plurality of angled hooking elements disposed along upper lateral edges of the molding engagement clip and a plurality of outwardly projecting feet adapted to limit downward movement of the molding strip, the feet extending outwardly from the molding engagement clip at a clip at an elevation below the angled hooking elements.

18. The molding retainer as recited in claim 15, wherein each of the circumferentially curved snap structures comprises a plurality of snap fingers arranged in side by side relation to cooperatively define a curved arc projecting radially inwardly at the interior of the stud containment ring.

19. The molding retainer as recited in claim 18, wherein each of the snap structures has a dogleg configuration including a leg segment projecting away from an inner wall of wall of the stud containment ring to a raised wall spaced apart from the inner wall of the stud containment ring.

20. A method of holding an elongate molding strip having a C-section support in covering relation to a vehicle roof ditch over a connection stud having an enhanced diameter head within the vehicle roof ditch, the method comprising the steps of: providing a molding engagement clip adapted to engage an underside of the molding strip in nested relation to the C-section support such that the C-section support extends in arched relation between opposing lateral sides of the molding engagement clip, the molding engagement clip including an arrangement of molding attachment elements adapted to lockingly engage interior surfaces of the molding strip, the molding engagement clip including an acceptance opening oriented for alignment with the connection stud and a pair of window slots disposed on opposite sides of the acceptance opening; providing a stud engagement latch, non-integral with the molding engagement clip, the stud engagement latch including a raised stud containment ring adapted for insertion at least partially into the acceptance opening in the molding engagement clip, the stud containment ring including a pair of opposing snap structures projecting radially inwardly and adapted to snap behind the enhanced diameter head upon insertion of the connection stud, the stud engagement latch further including a plurality of upwardly projecting snap-in latch elements positioned for alignment with the window slots when the stud containment ring is inserted into the acceptance opening, each of the upwardly projecting snap-in latch elements having a catch structure at an effective height to latch behind a surface adjacent a corresponding window opening upon at least partial insertion of the containment ring into the acceptance opening;

inserting the upwardly projecting snap-in latch elements through corresponding window slots to establish a latched connection between the molding engagement clip and the stud engagement latch; inserting the molding engagement clip in nested relation to the C-section support; and inserting the connection stud into the raised stud containment ring between the opposing snap structures such that the opposing snap structures are disposed beneath the enhanced diameter head.

* * * * *